April 20, 1943.    J. THOMAY    2,316,901
ELECTRODE
Filed Jan. 31, 1941    2 Sheets-Sheet 1
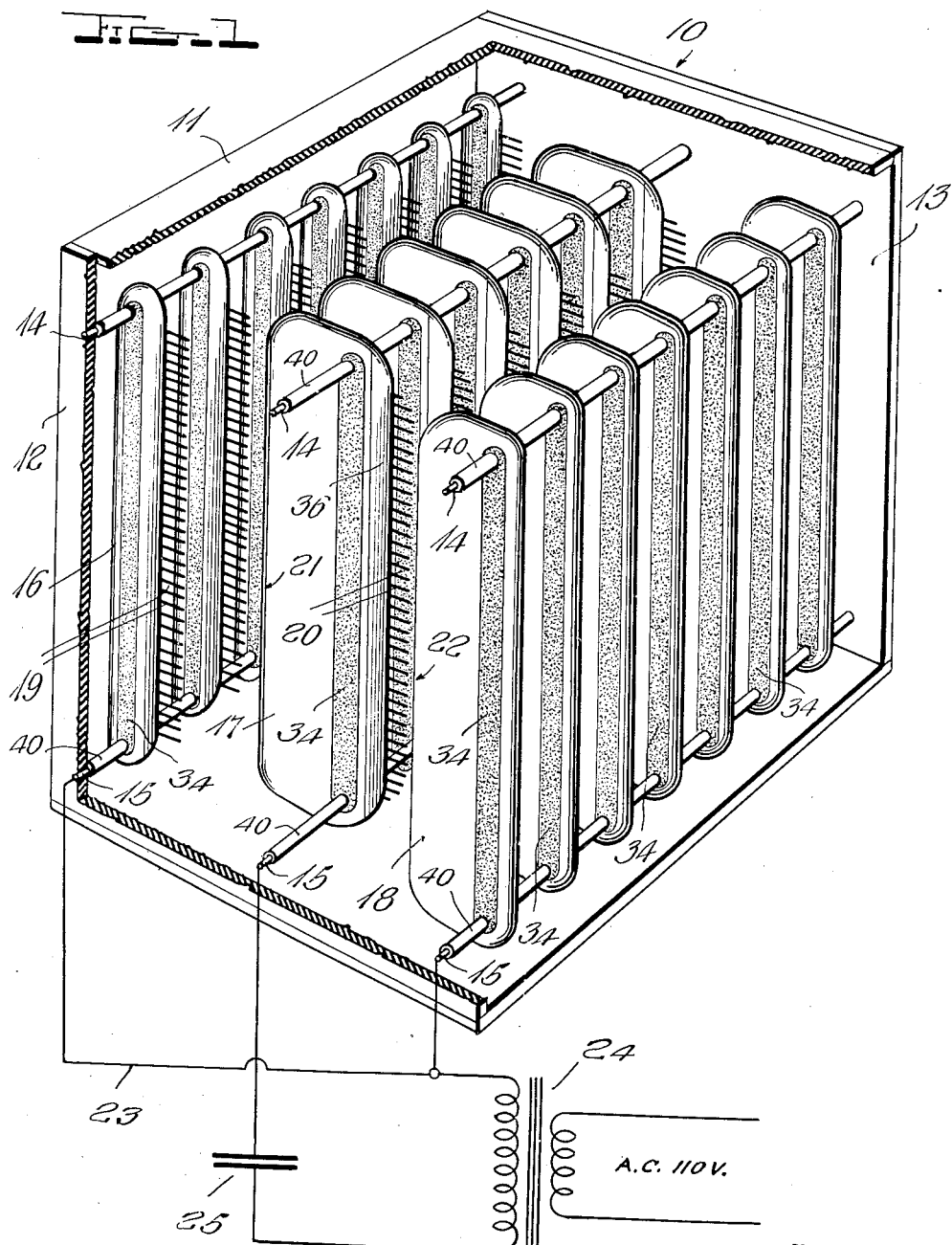
INVENTOR.
John Thomay,
BY
John B. Brady
ATTORNEY

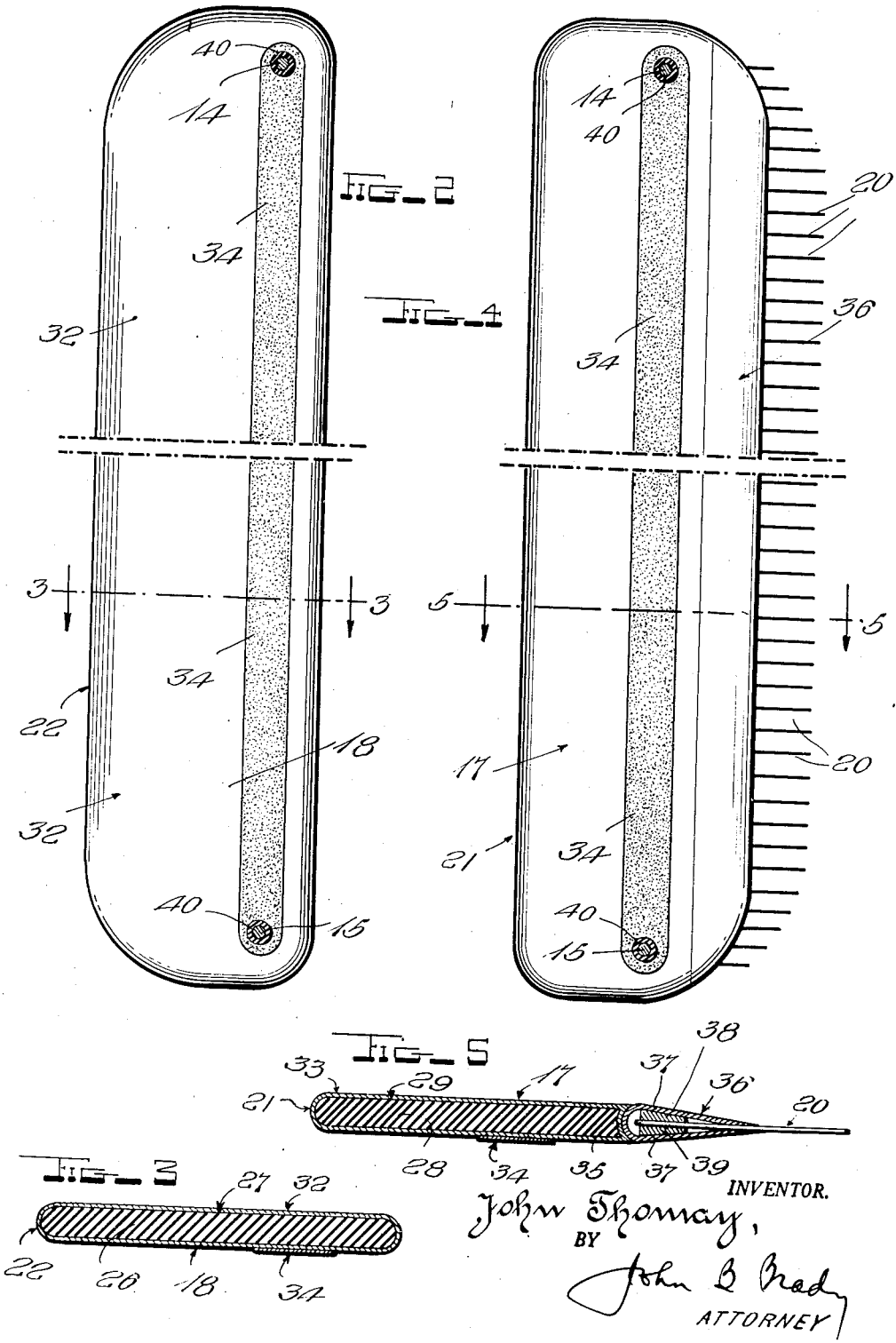

Patented Apr. 20, 1943

2,316,901

UNITED STATES PATENT OFFICE 2,316,901

ELECTRODE

John Thomay, Columbus, Ohio, assignor, by mesne assignments, to Games Slayter, Newark, Ohio Application January 31, 1941, Serial No. 376,935

8 Claims. (Cl. 230—69)

My invention relates to the construction of an electrode of the type used in an electric discharge apparatus operating in air. This application is a continuation-in-part of my application 296,707, filed September 26, 1939, entitled "Paper electrode elements" and which has issued into Patent #2,290,655 dated July 21, 1942.

In an electric discharge device employing what is known as a "diffuse discharge" the construction of the collecting electrode is extremely important. Such a device, in its simplest form consists of an emitting electrode and a collecting electrode suitably connected to a source of electrical energy. The "diffuse discharge" which takes place in such an apparatus is an electrical discharge through air of current substantial enough for practical energy conversions. This is accomplished by virtue of ionizations in the immediate vicinity of the emitting electrode, and a drift in a diffuse, that is to say, in a non-channelling manner, of charge across the gap to the collecting electrode, without any visible light being produced in the main portion of the gap by the passage of the charge. Without proper construction of the collecting electrode, it is not practicable to reliably suppress gliding streamers, surges, and similar irregularities in the operation of the electric discharge system.

Experiments with electric discharge apparatus employing the "diffuse discharge" in air have established the following facts with relation to the construction of the collecting electrode: The resistance between any point on the surface of a collecting electrode and the electrical bus of that electrode must be great enough so that any localization of current from the emitting electrode at any spot on the collecting electrode considerably changes the electrical potential of that point in a manner to decrease the current to that spot, further, the resistance between any point on the collecting electrode and the bus should be approximately the same as the resistance between any other point on that electrode to that bus. When these conditions are obtained any localization of current at the collecting surface, such as a streamer, spark, arc, etc. is effectively eliminated and collecting of current at the collecting electrode is maintained in a regular fashion regardless of position or time.

Since this resistance is of the order of megohms, it has been found that it is impossible to economically obtain a resistance material in which conduction could occur throughout the volume of the collecting electrode. However, a material with relatively low volume resistivity offers considerable surface resistivity when used in thin films.

In my Patent #2,290,655, supra, it was pointed out that paper impregnated with a conducting pigment was useful in electrical discharge apparatus. Although it was not understood at that time, further research and development work has shown that the reason for the operativeness of the paper electrode was that although its volume resistivity was comparable with other solid materials, its surface resistivity was relatively high because of the thinness of the layer through which conduction occurs, and was, in fact, high enough to accomplish the object desired.

Accordingly my invention is directed to practical ways in which a collecting electrode of the type used in a "diffuse discharge" apparatus of the type referred to can be made economically, uniformly and dependably.

One of the objects of this invention is to provide an electrode for an electric discharge apparatus of the "diffuse discharge" type which will provide a resistance path for electric currents of such a nature that concentrations of current upon any portion thereof will be eliminated.

Another object of my invention is the provision in an electrical apparatus of the type set forth of an electrode having a resistive path from which heat can be readily radiated from any spot in that resistive path.

A further object of my invention resides in the treatment of electrode surfaces in an electric discharge system of the type set forth to incorporate dependability to the operation of the system under all conditions.

A still further object of my invention is the construction of an electrode assembly in a discharge system of the type set forth which has a relatively thin resistive surface designed to prevent localization of discharge in any one portion of the electrode.

Additional and further objects of my invention will be apparent from the following description and drawings wherein:

Figure 1 is an isometric view of an electric discharge system employing the electrode of my invention; Fig. 2 is a partial side elevational view of a collecting electrode embodying my invention; Fig. 3 is a cross sectional view taken on lines 3—3 of Fig. 2; Fig. 4 is a partial side elevational view of a combination emitter and collecting electrode embodying my invention; and Fig. 5 is a cross sectional view taken on lines 4—4 of Fig. 4.

With reference to the invention more in detail, there will be seen in Fig. 1 an isometric view of a fan 10 containing electrodes of my invention. The fan is housed in a container 11 having end plates 12 and 13 in which are seated upper and lower rods 14 and 15 upon which are mounted electrodes 16, 17, and 18, in banks. The electrodes in each bank are spaced from one another approximately one inch. The distance from the fine wires 19 and 20 in electrodes 16 and 17 to the respective collecting surfaces 21 and 22 of electrodes 17 and 18 is also approximately one inch. It will be observed that each electrode is in a plane midway between the two electrodes immediately in front of it.

Each of the electrodes 16 and 18 are connected through a bus 23 and the lower rods 15 to one of the terminals of the secondary winding of the transformer 24. This transformer is essentially a high voltage, low current transformer. The electrodes 17 have a blocking condenser 25 between them and the opposite terminal of the transformer 24.

With reference to the collecting electrodes more in detail, and with special reference to Figs. 2 and 3 wherein electrode 18 is shown, it will be seen that the electrode has a core portion 26 of wood or insulation material over the surface 27 of which is secured a layer of semi-conducting paper 32. Rubber cement or the like may be used as an adhesive between the paper and the core. Paper which has been manufactured with the incorporation of a conductive pigment into the pulp, under conditions of close control, exhibits electrical conducting characteristics which I have found useful in the operation of an electrical discharge device of the type disclosed. One such paper which possesses semi-conductive properties and which has been employed to advantage in accordance with my invention, is a black paper having a carbon black pigment. The resistivity of this paper has been found to be substantially uniform because of the close control exercised in its manufacture. The material should have a uniform resistivity. In the present instance paper having a resistivity of from 20 to 200 megohms centimeters per centimeter have been used in thicknesses up to .01 of an inch.

The electrodes 17 shown in Figs. 4 and 5 are combination collecting and emitting electrodes, in that they act as collecting electrodes for emitting electrodes 16, and as emitting electrodes for collecting electrodes 18. The core 28 of each of these electrodes is formed of pressed board, although any suitable insulating material can be used as the core of the electrodes. The forward peripheral edge of the core 28 is provided with a longitudinally extending semi-circular groove indicated at 35 into which a substantially streamlined carrier 36 which provides mounting means for the fine wires 20 is seated. The stream-lined carrier 36 comprises a strip of semi-conductive material 37 bent into a U-shape to embrace the tapes 38 and 39 between which the fine wires 20 are spacially positioned. Over the surface 29 of the core 28 of this electrode there is applied a semi-conductive ink 33. Inks or paints containing a semi-conductive oxide having a resistivity (when dry) of 20 to 200 megohms centimeters per centimeter have been used. The thickness of the layer or layers of ink on this electrode may be .02 of an inch. If this ink or paint has any tendency to work into or through the core, it is advisable to first treat the core with any well known sealing agent. The semi-conductive ink 33 extends over the surface of the curved recess 35 in core 28 and electrically connects with the material of semi-conductive strip 37 within which the emitting wires 20 are mounted. A suitable conductive cement is employed for securing the carrier assembly 36 in the longitudinally extending recess 35.

In both of the electrodes there is shown a bus 34 of semi-conducting ink such, for example, as aquadag of very small resistivity compared to the resistivity of either the paper 32 or the ink 33.

In Figs. 2 and 3 I have shown the aquadag or other semi-conducting ink extending longitudinally along the electrode between rods 14 and 15 on the outside surface of the semi-conducting paper.

In the emitting electrode of Figs. 4 and 5, I have shown the aquadag, or other low resistance ink, extending longitudinally between rods 14 and 15 over the surface of the ink 33. Thus, electrical connection is established between the rods 14 and 15 and the wires 20 through the medium of the semi-conducting ink 33 and the semi-conductive strip 37, forming the mounting means for the emitter wires. Sleeves of insulating material 40 are provided to separate adjacent electrodes.

The operation of the fan is as follows: The alternating potential of the transformer 24 is transferred through the condenser 25 to the emitting wires 20 of electrode 17 through the medium of rod 15, and bus 34 and resistive material 33. It is also transferred from the opposite terminal of the transformer 24 to wires 19 in the same manner for electrodes 17. This potential when placed between the wires 19 and the target portions 21 of electrodes 17, and between wires 20 and the collecting surface 22 of electrode 18 serves as a source of energy for the discharge from the wires to the collecting surfaces of electrodes 17 and 18. The size of each wire segment and the resistance of the material behind that wire cooperate to restrict the admittance through each wire segment to a small enough value to maintain the discharge in a diffuse form so as to give a total admittance through the whole of the electrodes 16 and 17 allowing substantial and practical conversion of power. The proper treating of the surfaces of electrodes 17 and 18 in applying a thin layer of semi-conductive material having a relatively low volume resistivity, but a high surface resistivity makes it possible to make practical the use of the "diffuse discharge" electrical discharge apparatus, by making it reliable and economical to construct and produce.

I do not wish this invention to be limited to papers and inks, since every material I have used which was thin and did not support surface streamering, and which had an even resistivity throughout the material has operated satisfactorily.

While I have described my invention in certain preferred embodiments, I desire that it be understood that modifications may be made and I intend no limitations upon my invention other than may be imposed by the scope of the appended claims.

What I claim as new and desire to secure by Letters Patent of the United States is as follows:

1. An electrode having a body portion which is a relatively poor conductor of electricity, a semi-conducting material enclosing said body portion for imparting a resistive characteristic to the surface of the body, and a bus connector supported exteriorly of and directly on the body in electrical contact with the semi-conducting material.

2. An electrode having a body portion of insulation material, a semi-conducting material extending over the outer surface of the body to impart resistive characteristics to the surface, a bus supported exteriorly of the body and directly on one side of the body in electrical contact with the semi-conducting material, and spaced terminal elements electrically connected to the bus.

3. In an electrode, a body of insulating material having a covering of semi-conducting material for imparting resistive characteristics to the surface of the body, and a bus comprising a relatively narrow strip of conducting material extending along one side of the body and having an electrical contact with the semi-conducting material.

4. An electrode having a body of insulation material and having electrical terminal elements extending through spaced openings in the body portion, a covering for the body of semi-conducting material imparting resistive characteristics to the surface of the body and having openings registering with the openings in the body for receiving the terminals, and a bus comprising a relatively narrow strip of conducting material extending from one terminal to the other in electrical contact with the semi-conducting material.

5. An electrode having a body of insulating material, a covering for the body of semi-conducting material imparting resistive characteristics to the surface of the body, an aquadag bus supported exteriorly of the bus and extending over the semi-conductive material in electrical contact with the latter.

6. An electrode having an elongated body of insulating material, a covering of semi-conducting material for the body, and a relatively narrow strip of conducting material extending longitudinally of the body adjacent one longitudinal edge of the body and electrically contacting the semi-conducting covering material.

7. An electrode having a body of insulating material enveloped in a semi-conductive material for imparting resistive characteristics to the surface of the body, a bus extending along one side of the body in electrical contact with the semi-conductive material, a plurality of emitters supported in spaced relation to each other at one edge of the body, and means electrically connecting the emitters to said bus.

8. An electrode having a substantially flat elongated body enveloped in a semi-conductive material for imparting resistive characteristics to the surface of the body, a bus comprising a relatively narrow strip of conducting material extending along one side of the body adjacent one longitudinal edge of said body and electrically contacting the semi-conductive material, a carrier element secured to the said one longitudinal edge of the body and forming a continuation of the body, a plurality of emitters secured to the carrier element in lateral spaced relation and projecting from the carrier element, and a sheath of semi-conductive material for the carrier element electrically connecting the emitters to the semi-conductive material on the electrode body.

JOHN THOMAY.